United States Patent [19]
Isono

[11] Patent Number: 4,926,430
[45] Date of Patent: May 15, 1990

[54] LASER MODULE WITH A BUILT-IN OPTICAL ISOLATOR, AND METHOD OF ADJUSTING THE ANGULAR POSITION OF THE OPTICAL ISOLATOR

[75] Inventor: Hideki Isono, Yokohama, Japan
[73] Assignee: Fujitsu Limited, Kawasaki, Japan
[21] Appl. No.: 429,476
[22] Filed: Oct. 31, 1989
[30] Foreign Application Priority Data
Nov. 18, 1988 [JP] Japan .............................. 63-290045
[51] Int. Cl.$^5$ .............................................. H01S 3/00
[52] U.S. Cl. ................................. 372/33; 350/96.15; 350/375
[58] Field of Search ................. 372/33, 109; 350/375, 350/96.15, 96.18, 96.20

[56] References Cited
U.S. PATENT DOCUMENTS
4,686,678 8/1987 Ohta et al. ............................ 372/33

FOREIGN PATENT DOCUMENTS
0148918 7/1987 Japan .................................. 350/375
0065419 3/1988 Japan .................................. 350/375

Primary Examiner—James W. Davie
Attorney, Agent, or Firm—Staas & Halsey

[57] ABSTRACT

A semiconductor laser module comprising a serial arrangement of a laser assembly for emitting a substantially collimated beam of light, an optical isolator assembly having an optical isolator housed in a tubular package for transmitting the collimated beam of light with less loss in a forward direction than in a reverse direction, and an optical fiber assembly having a lens for converging and directing the beam from the optical isolator assembly into an optical fiber. There is also disclosed a method of optimizing the forward loss and isolation characteristics of the optical isolator assembly through adjustment of its angular position about its optical axis which is set at an angle to that of the laser assembly. For such adjustment, not only the isolator assembly is made rotatable relative to the laser assembly, but also the optical isolator itself is made rotatable within limits relative to the tubular package of the isolator assembly.

4 Claims, 4 Drawing Sheets

LASER MODULE WITH A BUILT-IN OPTICAL ISOLATOR, AND METHOD OF ADJUSTING THE ANGULAR POSITION OF THE OPTICAL ISOLATOR

BACKGROUND OF THE INVENTION

This invention belongs to the broad realm of fiber optics and pertains more specifically to a laser module comprised of a serial arrangement of a laser assembly, an optical isolator assembly and an optical fiber assembly. The invention also specifically concerns a method of adjusting the angular position of the optical isolator assembly with respect to the laser assembly for optimum forward loss and isolation characteristics.

Optical transmission systems have been known which employ optical fibers in combination with such sources of coherent beams of light as semiconductor lasers and light-emitting diodes. Constituting indispensable parts of such optical transmission systems are what are known to the specialists as photosemiconductor modules. The photosemiconductor module serves to mechanically interconnect the light source and one end of a length of optical fiber. Also, comprising a converging lens system, the photosemiconductor module functions to direct the beam of light from the source into the optical fiber.

In the use of a semiconductor laser as the light source, its operation would become unstable should it be exposed to reflections of the beam as from the end of the optical fiber. Therefore, in such cases, a semiconductor laser module is adopted which incorporates an optical isolator (shown in FIG. 1 of the drawings attached hereto) between a semiconductor laser assembly and an optical fiber assembly. Operating on the principle of Faraday rotation, the optical isolator transmits the light from the laser assembly toward the fiber assembly with much less loss than in the opposite direction.

As incorporated in a semiconductor laser module, the Faraday rotation isolator now under consideration has its optical axis offset from that of the laser assembly. The angular position of the isolator about its optical axis is in need of adjustment relative to that of the semiconductor laser assembly for optimum performance. As conventionally practiced, however, the adjustment of the angular position of the isolator has often given rise to undesired variations in the forward loss and isolation characteristics of the isolator with the possible deformations of the module components or with a change in the output wavelength of the semiconductor laser in use. Such inconveniences heretofore encountered in the art will be later described in more detail with reference to the accompanying drawings.

SUMMARY OF THE INVENTION

The present invention provides a simple and readily practicable solution to the problem of how to adjust, in a laser module of the type defined, the angular position of an optical isolator assembly with respect to a laser assembly for optimum forward loss and isolation characteristics.

Briefly stated in one aspect thereof, the invention is directed to a method associated with a laser module of the type comprising a serial arrangement of a laser assembly for emitting a substantially collimated beam of light, an optical isolator assembly having an optical isolator housed in an isolator package for transmitting the collimated beam of light with less loss in one direction than in the opposite direction, with the optical isolator assembly having an optical axis set at an angle to the optical axis of the laser assembly, and an optical fiber assembly having a lens for converging and directing the beam from the optical isolator assembly into an optical fiber.

For adjusting the angular position of the optical isolator assembly with respect to the laser assembly, the method of this invention dictates that the optical isolator of the optical isolator assembly be made rotatable within limits about the optical axis of the optical isolator assembly relative to the isolator package. The optical isolator is first turned to one extremity of the predetermined stroke relative to the isolator package. Then, with the optical isolator held in that angular position relative to the isolator package, the complete isolator assembly is turned relative to the laser assembly in the same direction as the optical isolator was turned relative to the isolator package, until the loss of the beam traveling forwardly through the optical isolator assembly starts increasing. Then the optical isolator assembly and the laser assembly are locked together against relative rotation in the thus-determined relative angular positions. Then, with the isolator assembly and the laser assembly held locked together, the optical isolator is turned relative to the isolator package toward the other extremity of the predetermined stroke for optimizing the loss and isolation characteristics of the isolator assembly.

The method of this invention makes it possible to optimize the performance of the optical isolator assembly as its forward loss and isolation characteristics become free from fluctuations due to the causes set forth previously.

Stated in another aspect thereof, the invention is directed to the construction of the laser module that makes possible the adjustment of the angular position of the optical isolator by the method summarized above. The optical isolator is housed in the package, which may be tubular in shape, and is made rotatable relative to the package through a preassigned angle. The optical isolator and the package make up in combination the optical isolator assembly, which is wholly rotatable relative to the laser assembly.

The above and other features and advantages of this invention and the manner of realizing them will become more apparent, and the invention itself will best be understood, from a study of the following description and appended claims, with reference had to the attached drawings.

DETAILED DESCRIPTION

Figure 1:
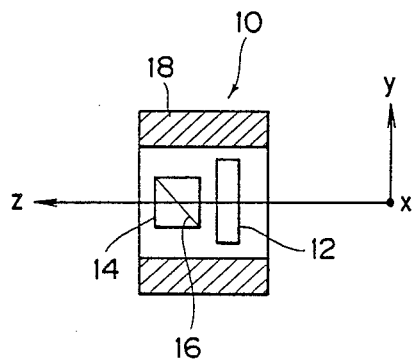
FIG. 1 is a diagrammatic axial section through the prior art optical isolator.

It is considered essential that the conventional optical isolator be shown and described in some more detail, the better to make clear the difficulties heretofore encountered in the art and the features and advantages of the present invention. With reference therefore to FIG. 1, which diagrammatically illustrates the prior art optical isolator 10, it will be seen that the device comprises a Faraday rotator 12 and a polarization-dependent beam splitter 14 in the form of a prism having a beam-splitting film 16. The Faraday rotator 12 and the beam splitter 14 are disposed one after the other on the optical axis of the device. Also included is a permanent magnet 18 of tubular shape coaxially surrounding the Faraday rotator 12 and the beam splitter 14 for providing a magnetic field needed by the Faraday rotator to perform the functions for which it is intended.

Let us assume a rectangluar coordinate system of x-, y- and z-axes, with the yz-plane constituting the plane of incidence on the film 16 of the prismatic beam splitter 14, as indicated in FIG. 1, in order to study the operation of the illustrated prior art optical isolator. The beam of light from a souce such as a semiconductor laser, not shown here, travels along the z-axis in the direction indicated by the arrowhead. Let us also suppose that the light beam from the unshown source is substantially linearly polarized, with its plane of polarization at 45 degrees with respect to the yz-plane.

Rotated 45 degrees by the Faraday rotator 12, the polarization plane of the incident light beam becomes parallel to the yz-plane; that is, according to optics parlance, the beam becomes P-polarized with respect to the plane of incidence on the film 16 of the beam splitter 14. Consequently, the incident light beam travels through the optical isolator 10 with a relatively little loss and enters an associated transmission path.

The reflection of the light beam, traveling over the transmission path in the reverse direction, also contains the P-polarized component with respect to the beam splitter film 16. This P-polarized component passes the beam splitter 14 with a relatively little loss, as in the above discussed case of forward travel therethrough. However, being subsequently rotated to possess a polarization plane at right angles with that of the light beam issuing from the unshown source, the P-polarized component does not affect the source.

The reflection of the light beam will also contain an S-polarized component, that is, the component having a plane of polarization perpendicular to the plane of incidence of the beam splitter film 16. The S-polarization will be reflected by the beam splitter film 16 and so eliminated before returning to the source.

Figure 2:
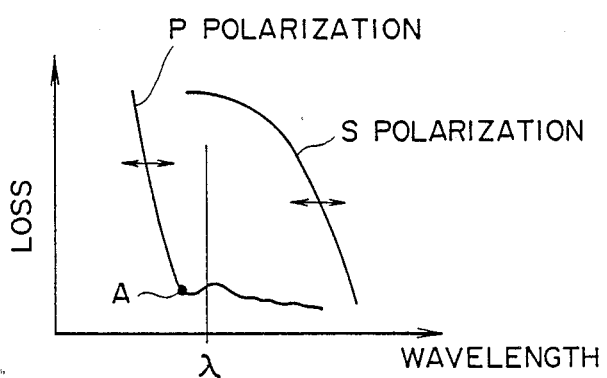
FIG. 2 is a graph explanatory of the known method of adjusting the angular position of the prior art optical isolator of FIG. 1, the graph plotting the curves of the losses of the P- and S-polarized beam components as they travel through the optical isolator, against their wavelength.

FIG. 2 graphically demonstrates the general performance characteristics of the beam splitter film 16, plotting the curves of the losses of the P- and S-polarized components against the wavelength of the beam emitted by the semiconductor laser in use. Functionally, the polarization-dependent beam splitter 14 of the FIG. 1, device 10 is required to transmit the P-polarized forward beam with as little loss as possible and to reflect and remove as much of the S-polarized component of the reverse beam as possible. The characteristic curves of the P and S polarizations should therefore be so predetermind that the P polarization suffers as little loss as possible, whereas the S polarization suffers as much loss as possible, for a given wavelength $\lambda$ of the incident beam.

The fact has been known that the characteristic curves of the P and S polarizations shift along the wavelength axis with variation in the angle of incidence on the beam slitter film 6, as indicated by the double-headed arrows in FIG. 2. Therefore, by taking advantage of this known fact, the characteristic curves of the beam splitter 14 have been predetermined as above through adjustment of the angle of incidence on the beam splitter film 32a.

Generally, as incorporated with a semiconductor laser module, the optical isolator is disposed at an angle to the module axis in order to avoid reflections at the prism surfaces. A change in the angular position of the isolator results in a change in the angle of incidence on the beam splitter film. The desired relative characteristic curves of the P and S polarizations have therefore been attained through adjustment of the angular position of the isolator.

This conventional method of optimizing the P- and S-polarization curves of the beam splitter film with respect to the wavelength of the beam emitted by the semiconductor laser has not been totally reliable. The unreliability arises from the fact tht it is only the intensity of the light emerging forwardly dfom the module that can be measured during the adjustment of the angular position of the isolator. Accurate adjustment has been impossible, or at least difficult, as the curves of FIG. 2 have had to be determined in relation to each other to locate the point A, where the loss of the P polarization abruptly starts increasing, only by measuring the intensity of the forwardly issuing light. Desired forward loss and isolation characteristics have often been not realized.

Suppose, as an example of maladjustment, that adjustment has been made so that the wavelength giving the point A on the P-polarization curve approximates the wavelength $\lambda$ of the light issuing from the laser diode in use. In that case the forward loss of the isolator has been prone to vary inrodinately with the possible mechanical deformations of the module components or with possible variations in the wavelength of the light emitted by the laser diode.

The present invention thoroughly overcomes such difficulties heretofore encountered in the art. The principles of the invention will be understood by first referring to FIG. 3, which schematically illustrates, by simple optical analogy, a semiconductor laser module with a built-in optical isolator suitable for use in the practice of the invention.

Generally designated 20, the semiconductor laser module is herein shown as a serial arrangement of a laser diode assembly 22, an optical isolator assembly 24 and an optical fiber assembly 26. The laser diode assembly 22 comprises a semiconductor laser 8 and a first lens 30, with the latter functioning to substantially collimate the beam of light from the former. The optical isolator assembly 24 has an optical isolator 32, enclosed in a package 34, capable of favorably transmitting the laser beam in a forward direction. The optical fiber assembly 26 comprises a second lens 36 disposed next to the optical isolator assembly 24, and a length of optical fiber 38. The second lens 36 functions to converge the light beam, issuing from the isolator assembly 24, into the optical fiber 38.

Figure 3:
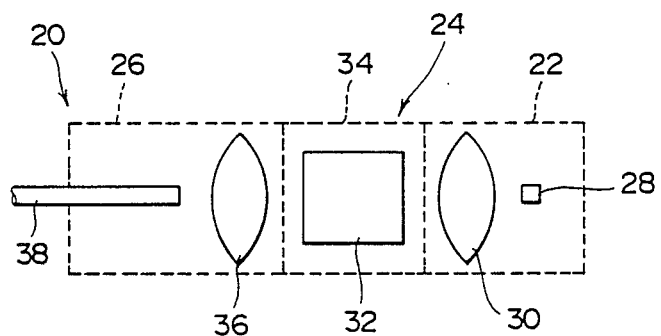
FIG. 3 is an illustration by simple optical analogy of the semiconductor laser module including the optical isolator assembly in accordance with the invention.
Figure 4:
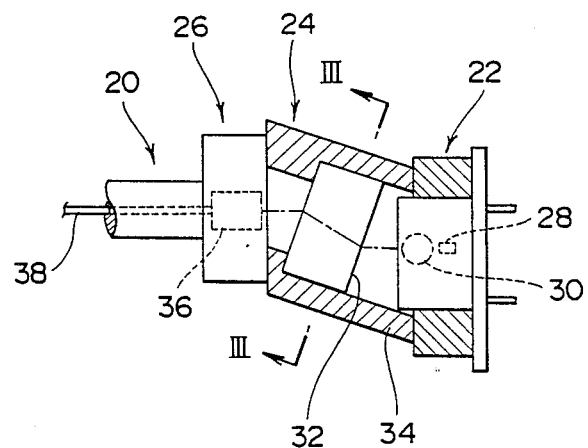
FIG. 4 is a diagrammatic axial section, partly in elevation, through a practical form of semiconductor laser module constructed on the principles of FIG. 3.

FIG. 4 is a more detailed illustration of the semiconductor laser module 20 constructed to embody the optical configuration of FIG. 3. The lens 30 of the semiconductor laser assembly 22 is shown as a spherical lens, and the lens 36 of the optical fiber assembly 26 as a converging rod lens.

It will be noted that the package 34 of the optical isolator assembly 24 takes the form of a tube having its opposite ends cut parallel to each other but at an angle to its axis. Thus the optical axis of the isolator assembly 24 is at an angle to the parallel axes of the laser assembly 22 and the fiber assembly 26. The semiconductor laser module 20 is formed by joining the laser assembly 22 and the fiber assembly 26 to the opposite slanting ends of the tubular package 34 of the isolator assembly 24.

Figure 5:
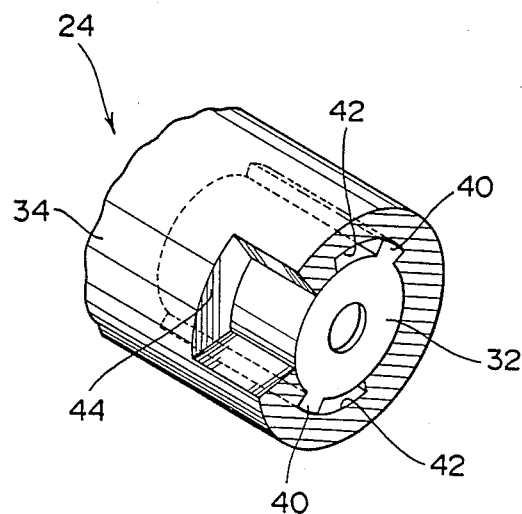
FIG. 5 is a slightly enlarged, fragmentary perspective view of the optical isolator assembly included in the laser module of FIG. 4, the isolator assembly being also shown sectioned along the line III—III in FIG. 4.

Reference is directed to FIG. 5 for a closer study of the optical isolator assembly 24. Cylindrical in shaps, the optical isolator 32 is slidably received in the tubular package 34 for angular displacement about their common axis. A pair of ribs 40 are formed longitudinally and in diametrically opposite positions on the surface of the optical isolator 32. These ribs 40 are received respectively in a pair of recesses 42 in the inside surfae of the tubular package 34. The recesses 42 are each wider than each rib 40, so that the isolator 32 is rotatable relative to the package 34 within the limits that are etermind by the difference in width between ribs 40 and recesses 42.

At 44 is seen an access opening of rectangular shape formed in the package 34. The isolator 32 may be revolved within the package 34 through this access opening 44.

Figure 6:
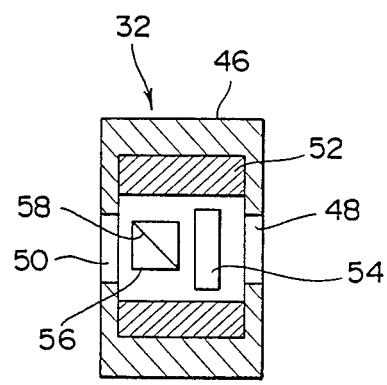
FIG. 6 is a diagrammatic axial section through the optical isolator included in the optical isolator assembly of FIG. 5.

FIG. 6 is a diagrammatic illustration of an axial section through the optical isolator 32. It has a housing 46 having a beam entrance opening 48 and a beam exit opening 50. Rigidly supported by and within the housing 46 is a permanent magnet 52 of tubular shape. A Faraday rotator 54 and a polarization-dependent beam splitter 56 are disposed about a common optical axis within the permanent magnet 52. The beam splitter 56 takes the form of a prism having a beam-splitting film 58. Thus the optical isolator 32 can be largely of prior art construction.

Such being the construction of the semiconductor laser module 20 for use in the practice of this invention, the method of adjusting the angular position of the optical isolator 32 according to the invention will now be described. First, as illustrated in FIG. 7A, the optical isolator 32 may be fully turned clockwise, as viewed in this figure, relative to the isolator package 34, until each of the pair of ribs 40 on the isolator comes into abutment against one of the opposite package walls bounding each recess 42.

Figure 7A:
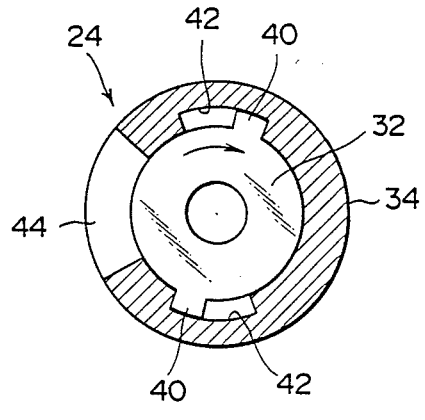
FIGS. 7A and 7B are both cross sections through the optical isolator assembly of FIG. 5, the views being explanatory of the method of adjusting the angular position of the optical isolator according to the invention.
Figure 8:
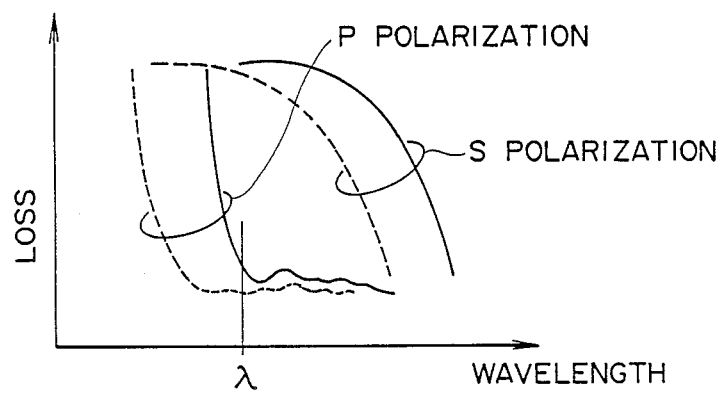
FIG. 8 is a graph similar to FIG. 2 but explanatory of the method of adjusting the angular position of the optical isolator according to the invention.

Then, with the isolator 32 and the package 34 held in the relative angular positions of FIG. 7A, the complete isolator assembly 24 (isolator 32 and package 34) may be turned relative to the semiconductor laser assembly 22 in the same direction as the isolator 32 was turned relative to the package 34. The rotation assembly 24 relative to the laser assembly 22 may be discontinued when the loss of the forward P-polarized beam starts increasing at the wavelength λ of the beam emitted by the semiconducgtor laser 28, as indicated by the solid-line curve in the graph of FIG. 8. Then, in the relative angular positions thus determined, the laser assembly 22 and the isolator assembly 24 may be locked together against rotation with respect to each other.

Figure 7B:
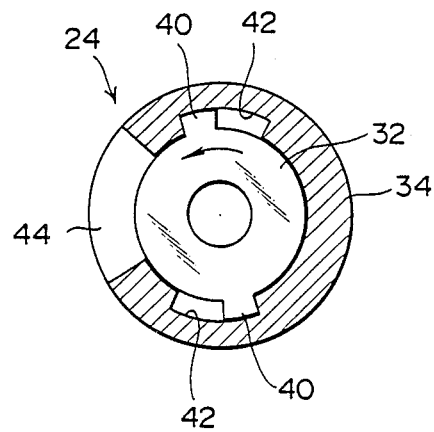

FIG. 7B shows the isolator 32 subsequently turned counterclockwise relative to the package 34 until the pair of ribs 40 thereon butt on the other package walls bounding the recesses 42. With such counterclockwise turn of the isolator 32 the P- and S-polarization curves of FIG. 8 will shift from their solid-line positions toward those indicated by the dashed lines. It is therefore possible to appropriately determine the characteristic curves in relation to the wavelength of the output beam of the semiconductor laser 28 with a view to unvarying forward loss and isolation characteristics in the face of possible variations in the laser beam wavelength.

The reader's attention is invited to the fact that the allowed stroke of angular displacement of the optical isolator 32 relative to its package 34 should not be made indefinitely long. For, in that case, the S-polarization curve of FIG. 8 would shift too much, with the consequent deterioration of isolation. The stroke shoudl be so determined as to avoid such deterioration.

It is, of course, understood that the present invention is not to be limited by the exact details of the foregoing disclosure. A variety of modifications, alterations or adaptations will readily occur to those versed in fiber optics and allied arts. For example, in order to determine the stroke of relative angular displacement between optical isolator and its package, a rib or ribs or similar projections may be formed on the inside surface of the package, and an associated recess or recesses in the housing of the isolator. It is therefore appropriate that the invention be construed broadly and in a manner consistent with the fair meaning or proper scope of the following claims.

What is claimed is:

1. In a laser module comprising a serial arrangement of a laser assembly for emitting a substantially collimated beam of light, an optical isolator assembly having an optical isolator housed in an isolator package for transmitting the collimated beam of light with less loss in one direction than in the opposite direction therethrough, with the optical isolator assembly having an optical axis set at an angle to the optical axis of the laser assembly, and an optical fiber assembly having a lens for converging and directing the beam from the optical isolator assembly into an optical fiber, a method of adjusting the angular position of the optical isolator assembly with respect to the laser assembly, which method comprises:

(a) making the optical isolator of the optical isolator assembly rotatable within limits about the optical axis of the optical isolator assembly relative to the isolator package;
  (b) rotating the optical isolator of the optical isolator assembly to one extremity of the predetermined stroke relative to the isolator package;
  (c) rotating the complete optical isolator assembly relative to the laser assembly in the same direction as the optical isolator was rotated relative to the isolator package, until the loss of the beam traveling through the optical isolator assembly in said one direction starts increasing;

(d) locking together the optical isolator assembly and the laser assembly against relative rotation in the relative angular positions that have been determined as a result of step (c); and (e) rotating the optical isolator of the optical isolator assembly toward the other extremity of the predetermined stroke relative to the isolator package for optimizing the loss and isolation characteristics of the optical isolator assembly.

2. A laser module with a built-in optical isolator assembly, providing for the adjustment of the angular position of the optical isolator assembly for optimum loss and isolation characteristics, comprising:

(a) a laser assembly for emitting a substantially collimated beam of light;

(b) an optical isolator for transmitting the collimated beam of light with less loss in one direction than in the other direction;

(c) an isolator package enclosing the optical isolator and making up an optical isolator assembly in combination therewith, the optical isolator assembly being joined to the laser assembly with an optical axis of the optical isolator assembly set at an angle to an optical axis of the laser assembly, the optical isolator assembly being rotatable about its own optical axis relative to the laser assembly, the optical isolator of the optical isolator assembly being also rotatable relative to the isolator package about the optical axis of the optical isolator assembly;

(d) means for limiting the relative rotation of the optical isolator and the isolator package of the optical isolator assembly; and (e) an optical fiber assembly having an optical fiber, and a lens for converging and directing the beam from the optical isolator assembly into the optical fiber.

3. The laser module of claim 2 wherein the means for limiting the relative rotation of the optical isolator and the isolator package comprises:

(a) a projection formed on either of the optical isolator and the isolator package; and (b) there being a recess formed in the other of the optical isolator and the isolator package for receiving the projection.

4. The laser module of claim 2 wherein the isolator package has an access opening formed therein for rotating the optical isolator relative to the isolator package.

* * * * *

UNITED STATES PATENT AND TRADEMARK OFFICE
CERTIFICATE OF CORRECTION

PATENT NO. : 4,926,430
DATED     : May 15, 1990
INVENTOR(S) : HIDEKI ISONO

It is certified that error appears in the above-identified patent and that said Letters Patent is hereby corrected as shown below:

Column 5, line 28, "shaps" should be --shape--.

Column 6, line 6, "semiconducgtor" should be

--semiconductor--;

line 29, "shoudl" should be --should--.

Signed and Sealed this

Sixth Day of August, 1991

Attest:

HARRY F. MANBECK, JR.

Attesting Officer

Commissioner of Patents and Trademarks